United States Patent
Delgado et al.

(10) Patent No.: US 10,432,302 B1
(45) Date of Patent: Oct. 1, 2019

(54) BIDIRECTIONAL OPTICAL FIBER AUTO-NOTIFIER TEST SYSTEM

(71) Applicant: Amazon Technologies, Inc., Seattle, WA (US)

(72) Inventors: Edgard Alberto Delgado, Seattle, WA (US); Kevin Giblin, Dublin (IE); Sean Smyth, Kilcock (IE); Matthew Connolly, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/633,707

(22) Filed: Jun. 26, 2017

(51) Int. Cl.
| | | |
|---|---|---|
| *H04B 10/071* | (2013.01) | |
| *H04B 10/073* | (2013.01) | |
| *G01M 11/00* | (2006.01) | |
| *H04B 10/40* | (2013.01) | |
| *H04J 14/02* | (2006.01) | |

(52) U.S. Cl.
CPC ....... *H04B 10/071* (2013.01); *G01M 11/3127* (2013.01); *H04B 10/40* (2013.01); *H04J 14/02* (2013.01)

(58) Field of Classification Search
CPC .......................... H04B 10/071; H04B 10/073
See application file for complete search history.

(56) References Cited

U.S. PATENT DOCUMENTS

| | | | |
|---|---|---|---|
| 5,093,568 A * | 3/1992 | Maycock | G01M 11/3136 250/227.14 |
| 5,285,305 A | 2/1994 | Cohen et al. | |
| 5,321,541 A | 6/1994 | Cohen | |
| 5,778,114 A | 7/1998 | Eslambolchi et al. | |
| 5,790,285 A | 8/1998 | Mock | |
| 5,963,312 A | 10/1999 | Roberts | |
| RE36,471 E | 12/1999 | Cohen | |
| 6,148,123 A | 11/2000 | Eslambolchi et al. | |
| 6,222,652 B1 | 4/2001 | Roberts | |
| 6,222,668 B1 | 4/2001 | Dutrisac et al. | |
| 6,774,348 B2 | 8/2004 | Guenter et al. | |
| 7,756,418 B2 | 7/2010 | Ofalt et al. | |
| 8,290,361 B2 | 10/2012 | Nakano | |
| 8,693,512 B2 | 4/2014 | Lecoeuche | |
| 9,054,806 B2 | 6/2015 | Zbinden et al. | |
| 9,088,355 B2 | 7/2015 | Moore et al. | |
| 9,100,125 B2 | 8/2015 | Mo et al. | |
| 9,118,413 B2 | 8/2015 | Niskanen et al. | |
| 9,154,220 B2 | 10/2015 | Sugawara et al. | |
| 9,160,452 B2 | 10/2015 | Louderback et al. | |

(Continued)

OTHER PUBLICATIONS

"iSFC Transceiver with Built-In Micro OTDR" Optical Zonu, available at: http://opticalzonu.com/sfc/otdrsfc, retrieved Apr. 4, 2017, 1 page.

(Continued)

*Primary Examiner* — Nathan M Cors
(74) *Attorney, Agent, or Firm* — Klarquist Sparkman, LLP

(57) ABSTRACT

Optical fiber communication systems include monitor filters that permit OTDR or other monitoring signals to co-propagate or counter-propagate on link fibers. OTDR measurements are periodically triggered, and acquired OTDR signatures are compared with store signatures to locate faults. The monitor filter can be used in single direction, dual OTDR bidirectional, or signal OTDR bidirectional (loopback) monitoring.

15 Claims, 14 Drawing Sheets

(56) References Cited

U.S. PATENT DOCUMENTS

| | | |
|---|---|---|
| 9,166,687 B2 | 10/2015 | Lg et al. |
| 9,184,834 B1 | 11/2015 | Zhang et al. |
| 9,191,109 B2 | 11/2015 | Zbinden et al. |
| 9,215,007 B2 | 12/2015 | Zhong |
| 9,264,135 B2 | 2/2016 | Chi et al. |
| 9,270,371 B2 | 2/2016 | Hou |
| 9,270,373 B2 | 2/2016 | Zbinden et al. |
| 9,281,913 B2 | 3/2016 | Hironishi et al. |
| 9,337,921 B2 | 5/2016 | Alfiad et al. |
| 9,350,447 B1 | 5/2016 | Detwiler et al. |
| 9,363,585 B2 | 6/2016 | Carpini et al. |
| 9,401,760 B2 | 7/2016 | Skirmont et al. |
| 9,461,737 B2 | 10/2016 | Wu et al. |
| 9,473,263 B2 | 10/2016 | Jiang et al. |
| 9,503,211 B2 | 11/2016 | Hironishi et al. |
| 9,608,720 B2 | 3/2017 | Smith |
| 9,608,721 B2 | 3/2017 | Dawe |
| 2009/0268197 A1* | 10/2009 | Perron ............... G01M 11/3118 356/73.1 |
| 2012/0243863 A1* | 9/2012 | Zhao .................... H04B 10/071 398/16 |
| 2017/0164076 A1* | 6/2017 | Chen ................... H04J 14/0246 |

OTHER PUBLICATIONS

"Optical Fiber Filter WDM FTTX 1625nm FS-FWDM-1625 #30218," FS.com, available at: http://vvww.fs.com/products/30218.html, retrieved Apr. 5, 2017, 3 pages.

"User Guide TN-SFP-BC55 and TN-SFP-BC55-I," Transition Networks, 47 pages (Mar. 30, 2016).

\* cited by examiner

| Reflectance | Distance | GPS | Int/Ext | Notification |
|---|---|---|---|---|
| Xxx | yyy | zzz | EXT | Vendor X |
| . | . | . | . | . |
| . | . | . | . | . |
| . | . | . | . | . |
| Xxx | yyy | zzz | INT | Data Center X |

US 10,432,302 B1

BIDIRECTIONAL OPTICAL FIBER AUTO-NOTIFIER TEST SYSTEM

BACKGROUND

Optical communication between data centers permits high data rate communication that can be used to satisfy user demands for both data storage and processing of stored or other data. In order to provide a satisfactory user experience, storage and processing outages must be infrequent and must be quickly identified and repaired. Unfortunately, in many cases, such outages are identified only when users encounter difficulties. In addition, repair is often unacceptably slow as it is difficult to identify a fiber location associated with an identified outage. Finally, even with an identified fiber location in a network topology, it is often time-consuming to find the corresponding physical location and determine who is responsible for repair. Accordingly, improved monitoring systems are needed that permit rapid identification and repair of fiber faults.

DETAILED DESCRIPTION

Figure 1:
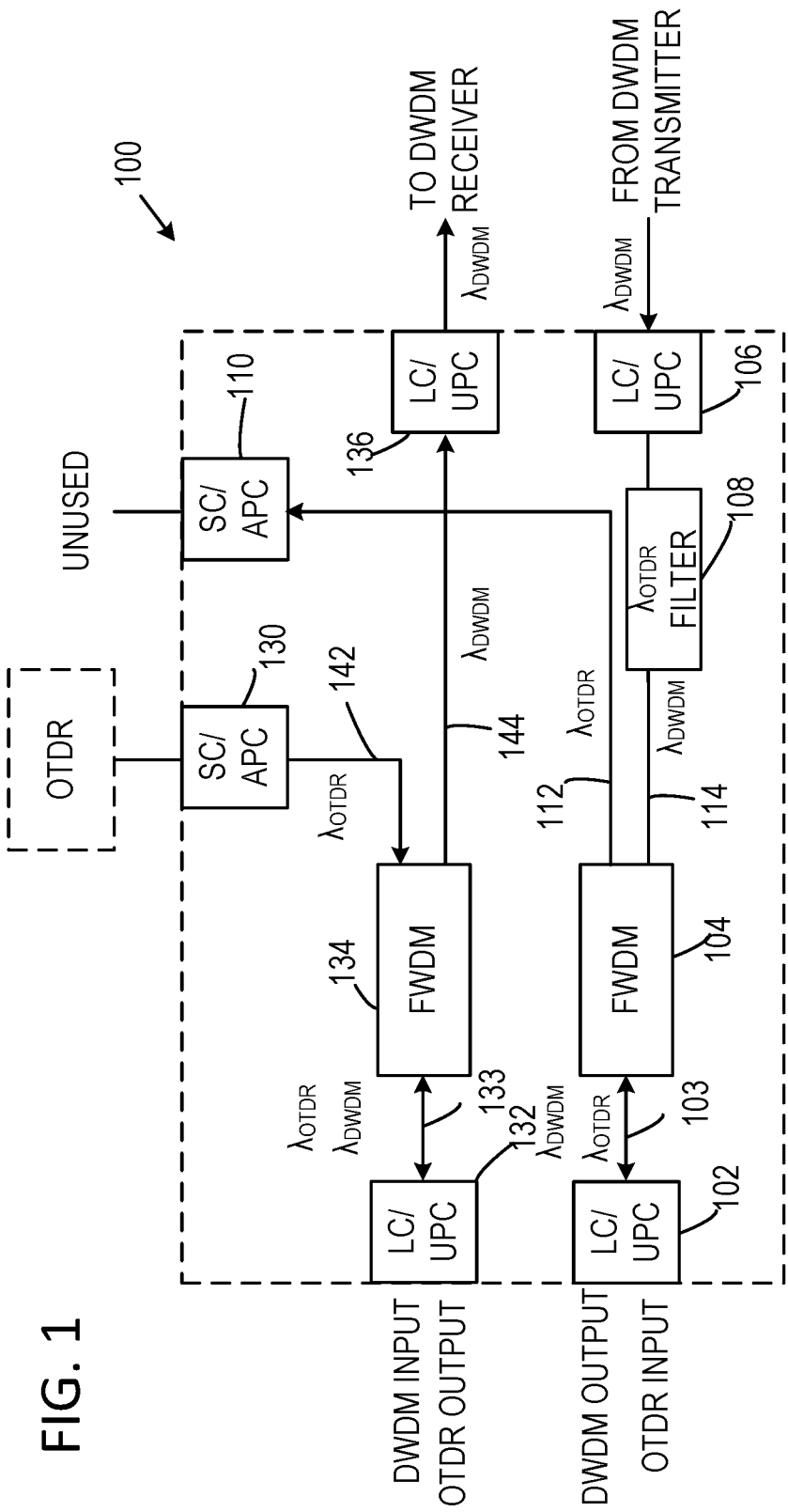
FIG. 1 illustrates an optical filter for use in Optical Time Domain Reflectometry (OTDR) monitoring of optical fiber links.

Filters that include fiber wavelength division multiplexers are situated to couple optical time domain reflectometers (OTDRs) to optical communication networks to provide built in fiber link testing. Using OTDRs, fiber links can be evaluated, even during operation, and network deterioration detected, and locations associated with deterioration identified for remediation. In one example, OTDR signals are coupled to a remote transceiver via a first link fiber and looped back via a second link fiber so that a single OTDR can interrogate a pair of link fibers with OTDR optical signals that are counter-propagating with respect to optical communication signals propagating in the first and second link fibers.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections. In some cases, locations of data centers or transceivers or other network components are referred to as local or remote for convenient description. Typically, local or remote locations are interchangeable.

In the following description, representative optical filters and filter assemblies are used that combine and separate optical signals used for data or other communications and signals such as optical time domain reflectometer signals (typically, optical pulses) used to monitor network and fiber characteristics. Such optical filters are generally referred to below as "filters" or "monitor filters." Optical fibers used to communication between data centers or between other different locations are referred to as "link fibers" to distinguish such fibers from short fibers and fiber segments used to form transmitters, receivers, and other optical communication components.

In some examples, optical fiber connectors are used to permit system reconfiguration. As shown in the accompanying drawings, angled physical contact (APC) or ultra physical contact (UPC) connectors are used. UPC connectors typically have slightly rounded end facets for direct contact to reduce coupling loss and in some drawings are noted as with a "U" in a box. APC connectors have end facets that are polished at an angle to reduce light reflects back into a fiber. For low return loss, APC connectors are generally preferred and are noted with an "A" in a box is some drawings. While UPC or APC connectors can be superior in some applications, either or both can generally be used. In other examples, fiber connections a made with splices such as fusion splices.

Fiber couplers or wavelength sensitive fiber couplers are used in some examples. Wavelength sensitive fiber couplers are referred to herein as fiber wavelength division multiplexers (FWDM). Such devices include one or more inputs and outputs, typically as lengths of optical fiber. For convenience, in some cases such fiber inputs and output are referred to as ports or fiber ports, as whether a particular fiber serves as an input or output depends on how the fiber coupler is arranged with respect to optical sources and detectors.

In typical examples, a wavelength sensitive fiber coupler or FWDM is selected to optically couple a first port to a second port at a first wavelength or wavelength range and optically couple a third port to the second port at a second wavelength or wavelength range that is different from the first wavelength or wavelength range. In some embodiments, the first wavelength range is associated with optical fiber communications such as a dense wavelength division multiplexing (DWDM) and the second wavelength or wavelength range is associated with probe pulse provided by an Optical Time Domain Reflectometers (OTDR).

Optical Time Domain Reflectometers (OTDRs) include a beam source that directs a beam along a fiber under test. Portions of the beam returned to the OTDR are detected at a receiver, and based on a propagation time in the fiber under test, fiber faults, breaks, poor connections, and other characteristics can be located for service. In most OTDRs, a very large return signal at a particular location can cause a blind spot or otherwise limit fault detection for a distance beyond the very large reflection, although in some cases optical switches are used to attenuate large reflections at particular locations. Optical fibers also return portions of OTDR signals throughout a fiber length due to Rayleigh scattering. Such scattering is weak, but most OTDRs are arranged to measure scattering, and a fiber break even absent a reflection back to an OTDR is apparent due to loss of a scattering signal.

As used herein, signal or optical signal such as an OTDR signal or communication signal refers to a time varying optical beam that is generally contained in and guided by a waveguide such as an optical fiber. OTDR signals are typically pulses, but sophisticated OTDRs using more complex signals (such as coded signals) can be used. Communication signal generally refers to an optical signal modulated to communicate data. For convenient explanation, DWDM multiplexed signals are used for illustration. Various types of faults can be detected using the disclosed approaches such as fiber breaks and excessive connector losses.

With reference to FIG. 1, a monitor filter 100 includes an optical fiber connector 102 that is coupled to a fiber port 103 of a first fiber wavelength division multiplexer (FWDM) 104. An optical fiber connector 106 is coupled to a reflective optical filter 108 that is coupled to a fiber port 114 of the first FWDM 104. The reflective optical filter 108 is configured to reflect at wavelengths associated with OTDR pulses and transmit at communication signal wavelengths. In typical embodiments for use with dense wavelength division multiplexing (DWDM) or other communication standards, optical signals at wavelengths associated with such communications are transmitted (typically in a band from 1290 nm to 1580 nm) and optical signals in a band from 1600 nm to 1670 nm are reflected. Typically, an OTDR probe pulse wavelength at or about 1625 nm is used. However, different bands can be used, and the selection of bands is generally limited only by the transmission bandwidth of the optical fibers used. For convenience in the following description, $\lambda_{com}$ or $\lambda_{dwdm}$ refers one or more communication wavelengths (or bands) such as DWDM wavelengths, and $\lambda_{OTDR}$ refers to a wavelength (or band) used for OTDR fiber link assessment.

The first FWDM 104 is coupled via fiber port 112 to a fiber connector 110 that is provided for coupling to an OTDR or to a loopback fiber as discussed below. The first FWDM 104 is configured to couple an OTDR beam between the fiber ports 103, 112 and couple a communication beam between the fiber ports 103, 114. For example, a combined communication beam/OTDR beam received from the connector 102 at the fiber port 103 is coupled so that an OTDR beam portion is coupled to the connector 110 and a communication beam portion is coupled to the connector 106. Portions of the OTDR beam coupled by the first FWDM 104 to the fiber port 114 are reflected by the filter 108 and do not reach the connector 106 or are substantially attenuated.

In the arrangement of FIG. 1, the first FWDM 104 permits an OTDR beam from the connector 110 and a communication beam from the connector 106 to combined and directed to the connector 102. In addition, the first FWDM 104 permits a combined communication/OTDR beam received from the connector 102 to be separated into an OTDR beam directed to the connector 110 and a communication beam directed to the connector 106. In most examples, OTDR beams and communication beams are arranged to counter-propagate due to interference effects and nonlinearities that can arise with co-propagation. Thus, it is generally preferable to situate the filter 100 to couple an OTDR beam from the connector 102 to the first FWDM 104 and to couple a communication beam received at the connector 106 to the connector 102. The reflective filter 108 then attenuates OTDR beam portions that might otherwise arrive at the connector 102.

A second fiber connector 132 is coupled to a fiber port 133 of a second FWDM 134 that is coupled by the second FWDM 134 to a fiber port 142 and to the connector 130 at an OTDR wavelength (or wavelength range) and to a fiber port 144 and the connector 136 at a communication wavelength (or wavelength range). In order to avoid co-propagating OTDR and communication beams, the second FWDM 134 is generally used to couple a communication beam to the connector 136 and to direct an OTDR beam from the connector 136 to the connector 132.

In FIG. 1, an example configuration in which communication beams and OTDR beams counter-propagate is indicated with DWDM beam inputs at the connectors 106, 132, DWDM beam outputs at the connectors 102, 136, and OTDR beam outputs at the connector 132 and OTDR beam input at the connector 102. The connectors 102, 132 are generally coupled to link fibers so as to connect the filter to one or more remote optical transmitters, receivers, and/or OTDRs.

Figure 2A:
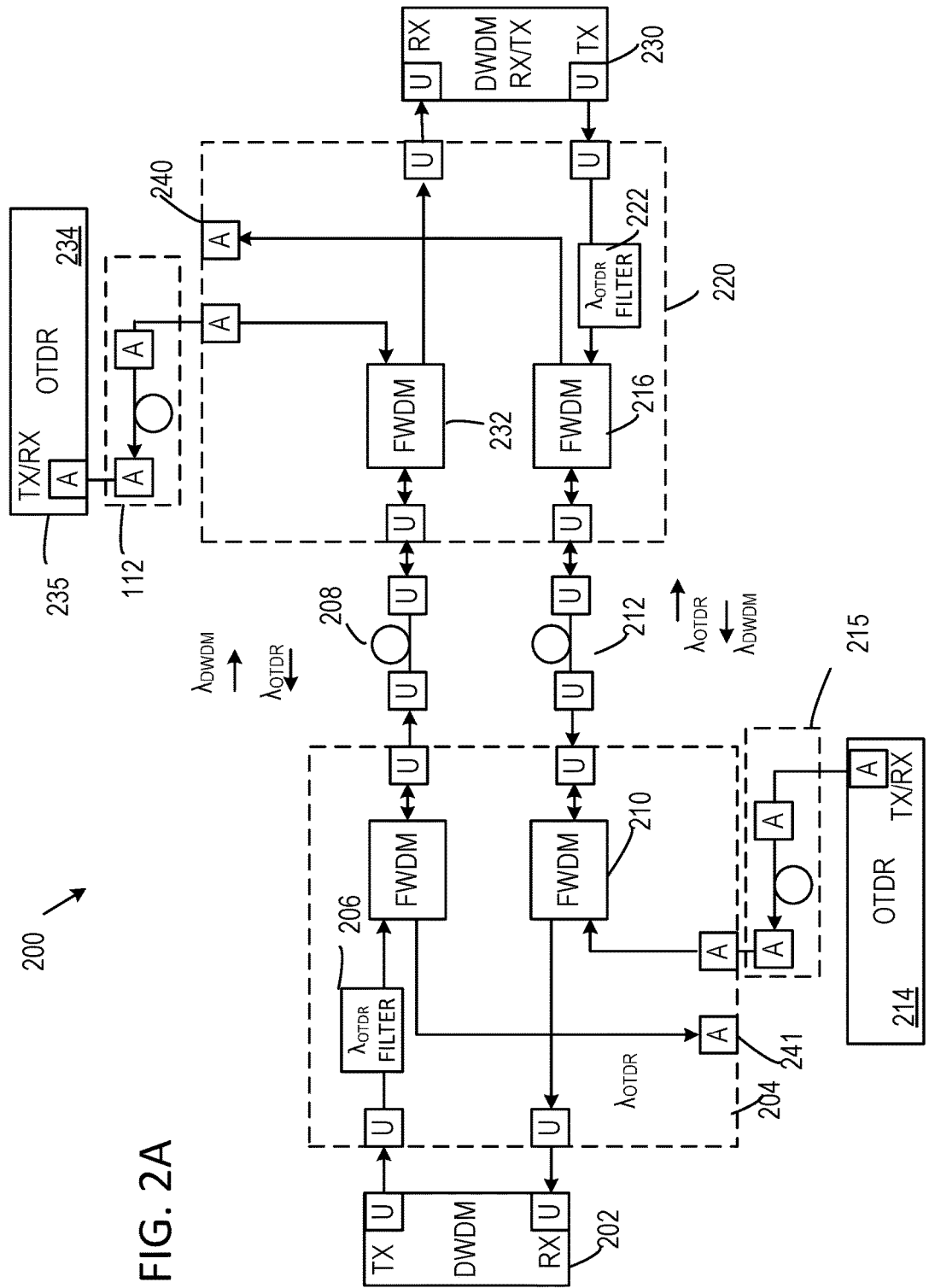
FIG. 2A illustrates a representative bidirectional monitoring system.

With reference to FIG. 2A, a communication system 200 includes a DWDM transceiver 202 coupled to a filter 204 such as the filter 100 of FIG. 1 so as to transmit a DWDM communication signal to an FWDM 206 that couples the DWDM communication signal to a link fiber 208. The DWDM transceiver 202 is coupled to an FWDM 210 to receive a communication signal from a link fiber 212. In addition, an OTDR 214 is coupled to transmit an OTDR signal on the link fiber 212. The OTDR 234 directs an ODTR signal to the filter 220.

The filter 220 is coupled to the link fiber 212 and couples the OTDR signal from the OTDR 214 to a FWDM 216 that directs the OTDR signal to a reflection filter 222 and a transmitted communication signal from the DWDM transceiver 230 to a receiver of the DWDM transceiver 202. A receiver of the DWDM transceiver 230 is couple to receive a communication signal from the link fiber 208 with an FWDM 232 that couples an OTDR signal from an OTDR 234 to the link fiber 208.

The OTDRs 214, 234 are coupled to the filters 204, 220, respectively, via fiber assemblies 215, 235 that include fibers that permit OTDR dead zones produced at OTDR connectors and components to be displaced in time from optical circuit features of interest. Fiber lengths of between 100 m and 5 km are typical, and in some examples, lengths of 500 m, 100 m, 1500 m, or 2000 m are used. Each of the filters 204, 220 includes an unused input/output (connectors 240, 241) that can be omitted if desired, or used as shown in some examples below.

Figure 2B:
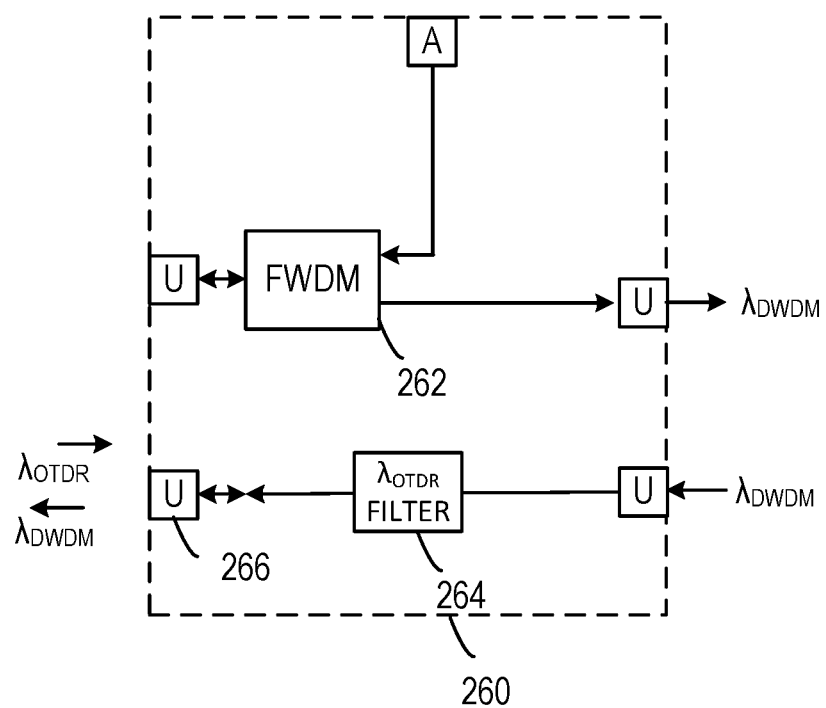
FIG. 2B illustrates a representative monitor filter.

FIG. 2B illustrates a representative filter 260 that is similar to the filters 204, 220 but includes a single FWDM 262 and a reflective or other OTDR wavelength filter 264 so that a communication beam is coupled through the filter 264 to a connector 266. An OTDR signal from a remote OTDR can be coupled into the filter 260 at the connector 266, and blocked from a transmitter by the reflective filter 264.

Figure 3A:
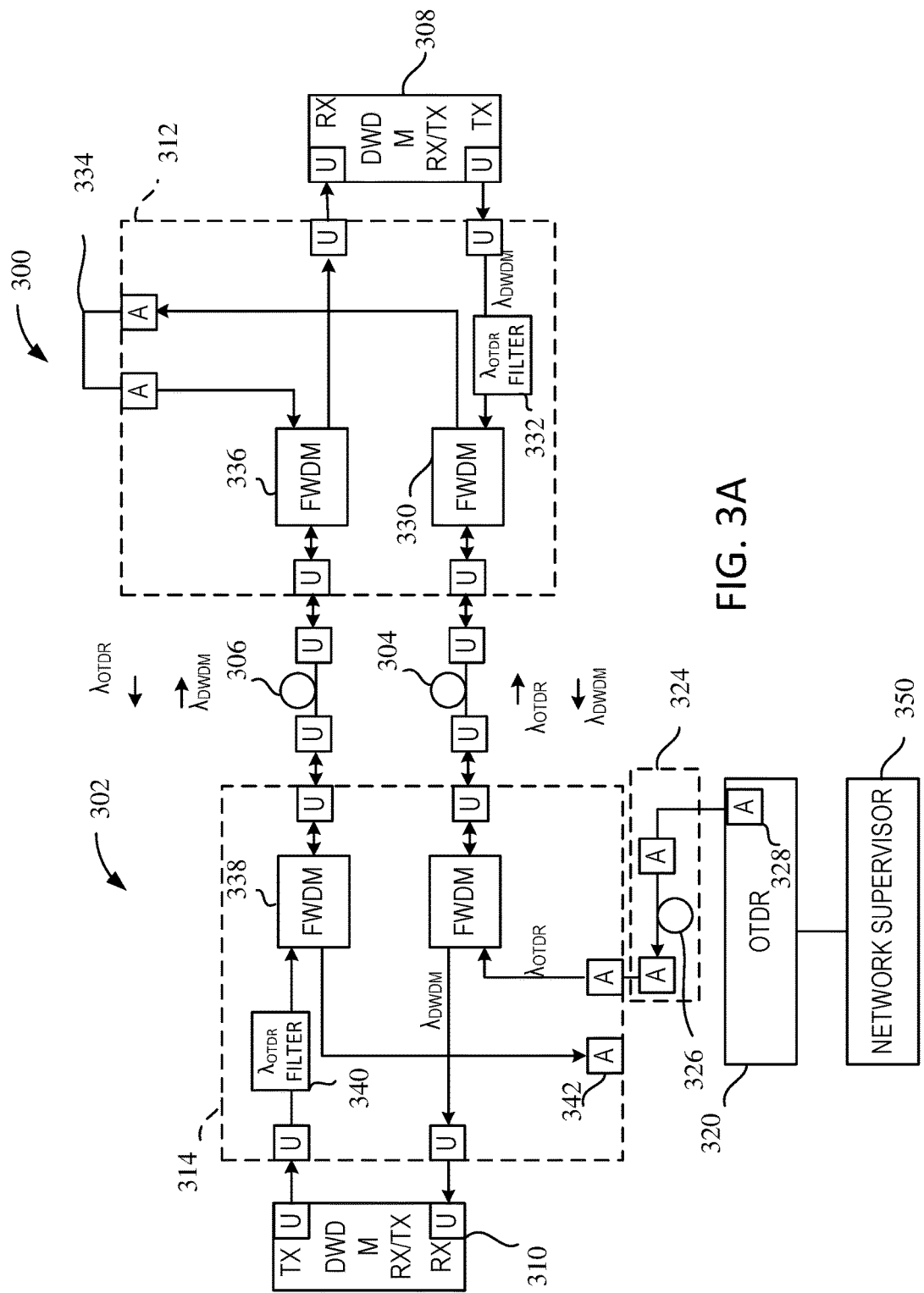
FIG. 3A illustrates a representative single ended monitoring system.

Referring to FIG. 3A, a communication system includes a first data center 300 and a second data center 302 that are coupled via optical fibers 304, 306. DWDM or other communication transceivers 308, 310 of the data centers 300, 302 are coupled to monitor filters 312, 314, respectively, that are similar to the filter shown in FIG. 1, and then to the optical fibers 304, 306. An OTDR transmitter/receiver 320 is coupled to a fiber assembly 324 that includes a fiber length 326 so that reflections of OTDR pulses at the OTDR transmitter/receiver 320 such as internal reflections of reflections at an input/output connector (for example, a connector 328) do not result in "blind spots" due to large reflections obscuring fiber features of interest.

The OTDR transmitter/receiver 320 directs an OTDR signal to the filter 314 so that the OTDR signal is coupled to the optical fiber 304 and the filter 312. A portion of the OTDR signal is then coupled by an FWDM 330 to a fiber bypass 334. The OTDR signal returned to the OTDR 320 by an OTDR reflective filter 332 can be associated with the filter 312, and receipt of such a signal portion by the OTDR 320 can be used to verify or evaluate an optical connection between the first filter 312 and the second filter 314. Typically, any breaks, misaligned connections, or other optical losses between the first filter 312 and the second filter 314 are associated with relatively large return (reflected) optical signals and/or changes in Rayleigh backscattering signals returned to the OTDR 320. For example, a broken link fiber may be associated with a reflection at a fiber break or with disappearance (or reduction) of received Rayleigh backscatter beyond the fiber break. Communication signals can be coupled between the second filter 314 (and the second transceiver 310) and the first filter 312 (and the first transceiver 308) and the fiber 304 can transmit both OTDR signals and communication signals.

At the fiber bypass 334, the OTDR signal is directed to an FWDM 336 and then via the fiber 306 to an FWDM 338 of second filter 314. A portion of the OTDR signal is directed to a reflective filter 340 and returned to the OTDR transmitter/receiver 320 and another portion directed to an unused port 342 that is available for coupling to an additional OTDR situated at the filter 302 or at the filter 312. Communication signals can be coupled between the second filter 314 (and the second transceiver 310) and the first filter 312 (and the first transceiver 308) and the fiber 306 can transmit both OTDR signals and communication signals.

Figure 3B:
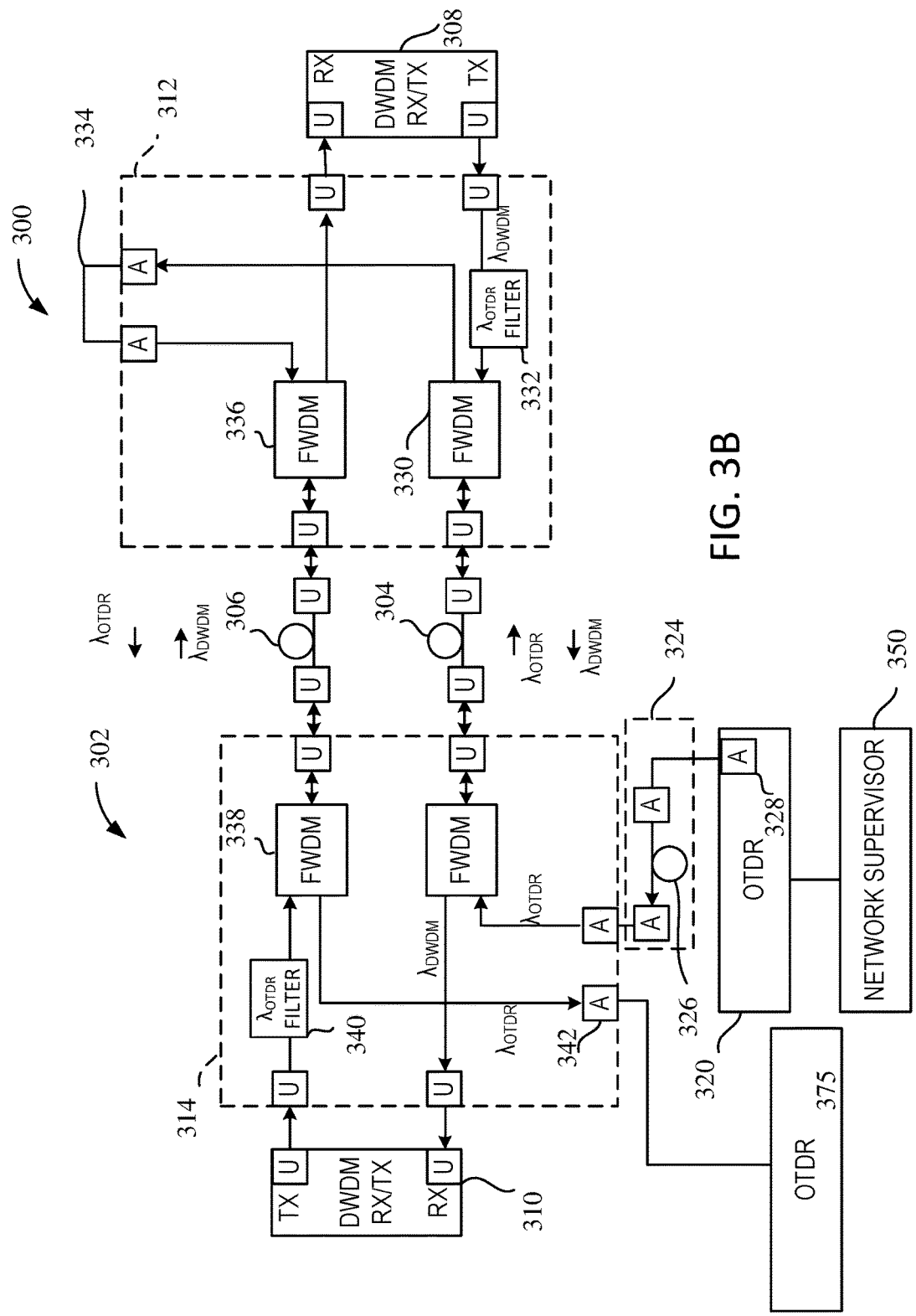
FIGS. 3B-3C illustrate additional representative monitoring system configurations.
Figure 3C:
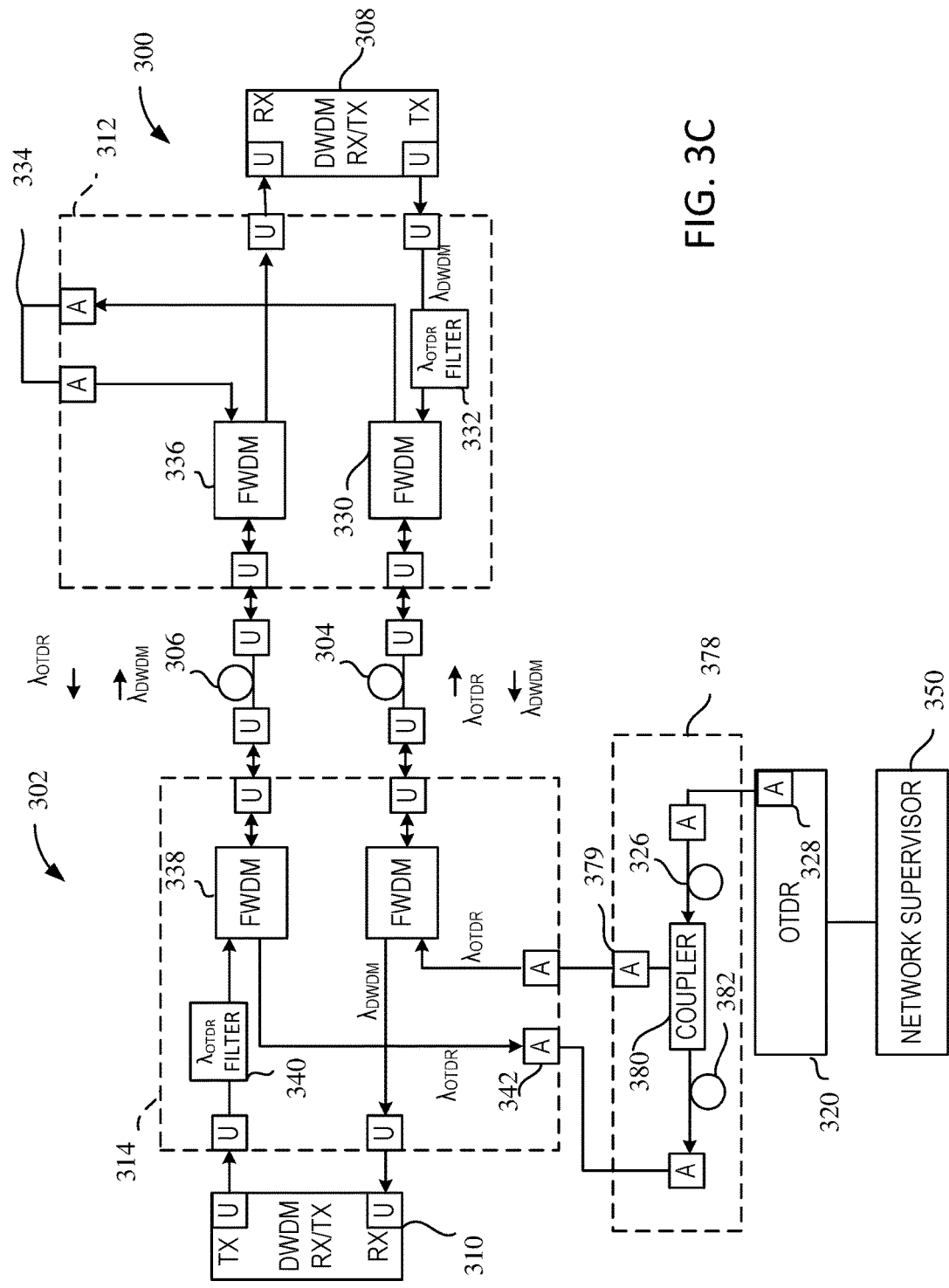

In the arrangement of FIG. 3A, a single OTDR is used, and can be situated at filters associated with either of the transceivers 308, 310. For example, by situating a single OTDR at each of the filters 312, 314, OTDR optical signals and communication optical signals can be arranged to counter-propagate. In addition, each of the data centers 300, 302 can be identically arranged, and a common filter/OTDR configuration can be used throughout a network. In other examples, unused ports (such as port 342) can be coupled to an additional OTDR such as optional OTDR 375 as shown in FIG. 3B so that a single data center can interrogate both link fibers 304, 306, although OTDR optical signals and communication optical signals might then co-propagate on the link fiber 306. Alternatively, a single OTDR such as the OTDR 320 can be coupled to the port 342 as well as shown in FIG. 3C. Received OTDR signals may then exhibit overlapping features but these features would still permit link assessments. Such overlap can be avoided with additional optical delay between OTDR signals introduced into the link fiber 304 and the link fiber 306. Such delay can be provided with one or more additional fiber delays, or by selecting a suitable length for the fiber length 326. As shown in FIG. 3C, a fiber assembly 378 is coupled to the OTDR 320 and includes the fiber length 326 that couples OTDR optical signals to a connector 379 and to a fiber coupler 380 which in turn couples portions of the OTDR optical signals to a fiber length 382. As a result, OTDR measurements of the link fibers 304, 306 are displaced. A network supervisor 350 is coupled to the OTDR 320 to compare OTDR signatures to determine possible faults and fault locations. Based on the fault location, an appropriate notification can be sent for fault remediation.

Figure 4B:
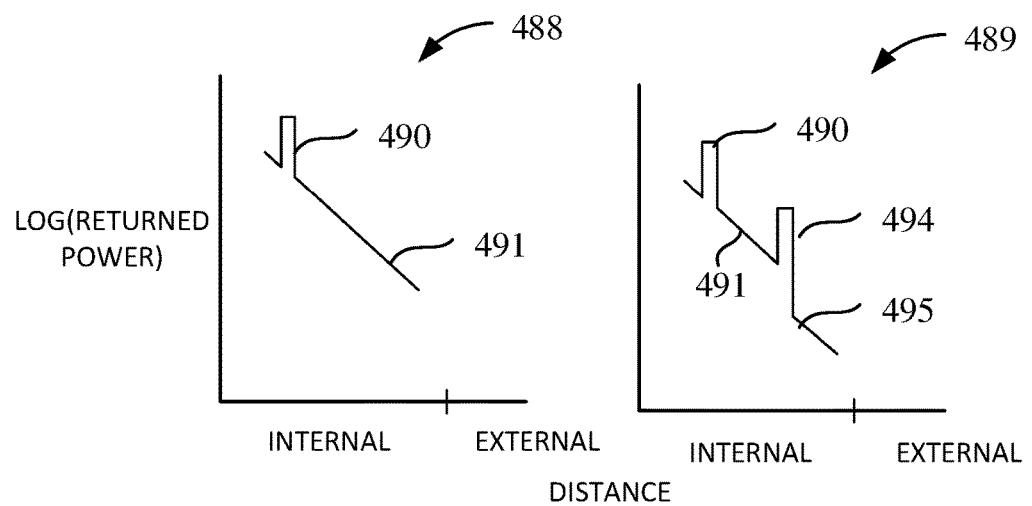
FIG. 4B illustrates representative OTDR signatures.
Figure 4A:
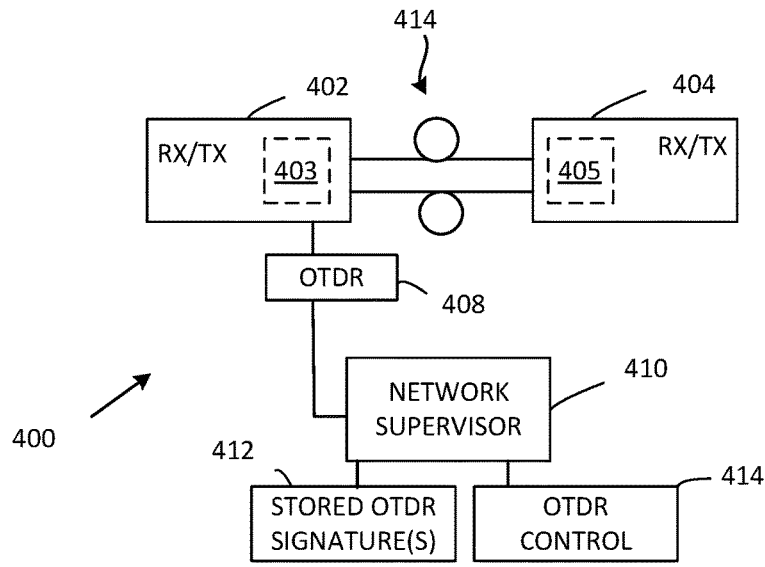
FIG. 4A illustrates a representative OTDR-based fiber monitoring system.

Referring to FIG. 4A, a transceiver 402 at a first data center 402 is coupled to a filter 403 as illustrated above that is in turn coupled to link fibers 414 to communicate with a transceiver 405 at a second data center 404 or other location. An OTDR 408 is coupled to the filter 403 to evaluate one or both of the fibers 414 and communicate OTDR evaluations to a network supervisor 410. The network supervisor 410 is coupled to one or more tangible storage devices 412, 414 that store OTDR signatures and OTDR control and communication instructions. Based on changes in OTDR signatures, the network supervisor 410 can send requests for fault correction to dark fiber vendors or the data center operators. In an example shown in FIG. 4B, an initial OTDR signature 488 includes a portion 490 associated with a reflection and a portion 491 associated with Rayleigh backscatter. A subsequently measured OTDR signature 489 includes a portion 494 associated with an additional reflection and a portion 495 associated with Rayleigh backscatter having a significantly reduced amplitude with respect to Rayleigh backscatter in the OTDR signature 488, indicating a coupling loss. In this example, this coupling loss is noted as internal to a data center, and can be reported as such. Typically, OTDR signatures are periodically acquired and evaluated for the changes in reflectance at one or more locations, and changes (especially decreases) in Rayleigh backscatter. OTDR signatures are generally acquired at rates of between about 10 mHz to about 100 Hz, but other rates can be used.

The network supervisor (or the OTDR 408) can control OTDR pulse power, pulse repetition rate, pulse duration (and thus OTDR resolution), averaging, or other OTDR measurement parameters. ODTR signals can be produced relatively infrequently to assess link condition, and rates of 10 OTDR signal pulses per second is sufficient, but higher or lower rates can be used. As discussed above, OTDR measurements can be used to detect changes in reflectance for fault assessment, but detection of Rayleigh scattering can also be used, particularly in fiber portions that in which reflectance is otherwise low.

Figure 5:
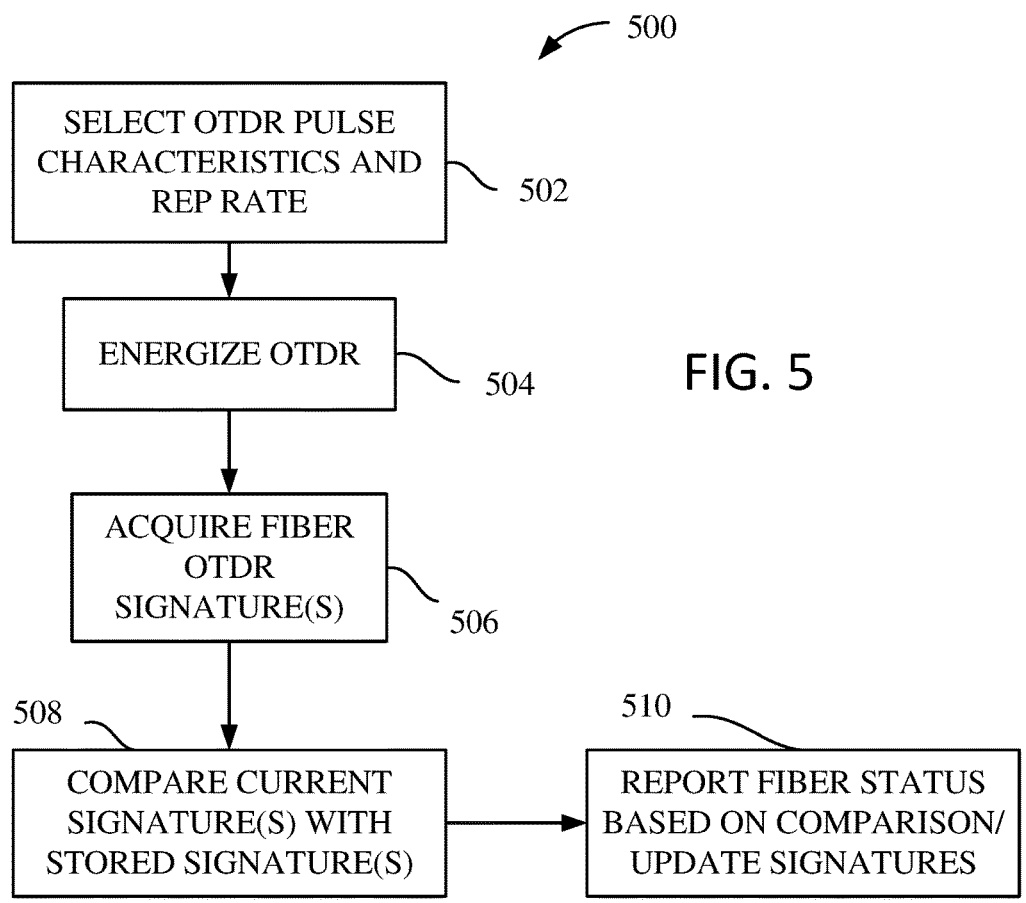
FIG. 5 is an example method for assessing optical fibers between links using a filter such as illustrated in FIG. 1.

FIG. 5 illustrates a method 500 of evaluating a fiber network. At 502, OTDR pulse characteristics and repetition rate are selected, and at 504, an OTDR is energized accordingly, and the OTDR pulses are launched into a filter that couples the OTDR pulses into at least one link fiber. OTDR pulse repetition rate is generally selected to avoid multiple pulses propagating in links under test and to avoid interference with communication signals. OTDR pulse width is generally selected based on an intended combination of range and resolution. Fiber signatures are acquired at 506 that typically include signature portions associated with link fibers and data center/local fibers and other components, and are compared with stored signatures at 508. At 510, status is reported based on the comparison, and fault correction can be initiated, or stored signatures updated.

Figure 6:
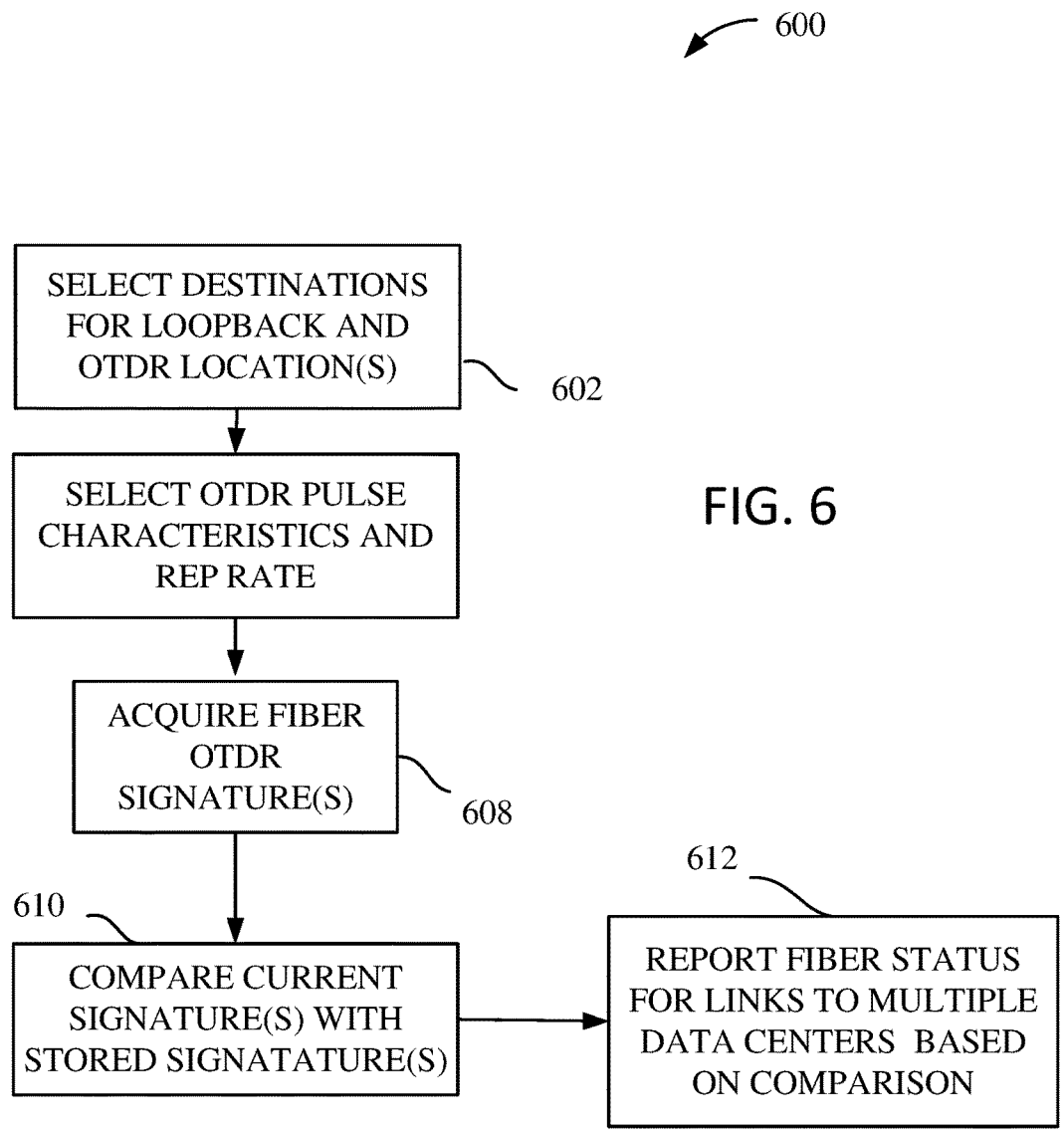
FIG. 6 is an example method for assessing optical fibers between multiple data centers using a filter such as illustrated in FIG. 1.

A representative method 600 shown in FIG. 6 includes placing filters and assigning OTDRs to selected filters at 602. For example, multiple OTDRs can be provided for bidirectional monitoring (e.g., similar to the arrangement of FIG. 2A), or a loopback configuration (similar to the arrangement of FIG. 5) can be selected. At 608, OTDR signatures are acquired and compared with stored signatures at 610. Fiber status is reported at 612 based on the comparison. In some examples, stored signature are not required and reflections larger than a predetermined threshold are reported as faults, along with Rayleigh scattering that is less than a predetermined value. The predetermined value is scaled with OTDR pulse length as Rayleigh scattering is a function of OTDR pulse width.

Figures 7, 8:
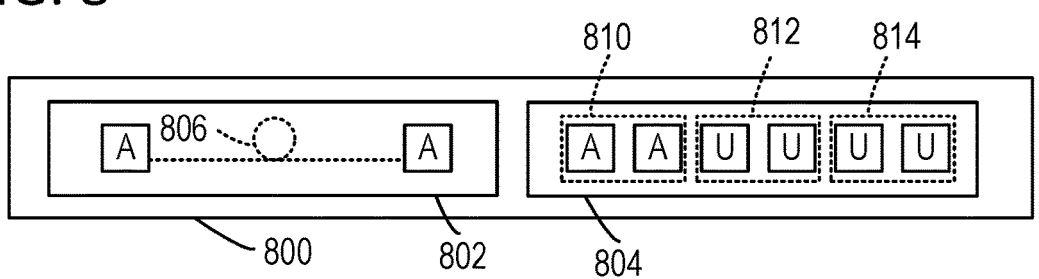
FIG. 7 illustrates representative fiber signature data and associated types of notifications.
FIG. 8 illustrates a connector panel for an OTDR based monitoring system.

FIG. 7 illustrates representative exemplary embodiments of signature events for use in monitoring. Reflectance at various propagation distances (and associated GPS coordinates) is recorded, and distances associated with vendors or with data center operators are noted for use in error notification.

Referring to FIG. 8, a communication device 800 includes a housing that includes a connector slot 802 for coupling an OTDR to a fiber delay 806 (internal to the device 800) as discussed above with two APC type connectors. A connector slot 804 accommodates connector pairs 810 (APC), 812 (UPC), 814 (UPC) for coupling to an OTDR, line fibers, and communication transceivers/transmitters/receivers, respectively.

In the examples above, filters that permit use of OTDR and communication signals are coupled to communication transceivers. In some examples, a particular filter is coupled to receivers and transmitters associated with different transceivers, or with individual transmitters and receivers. In some cases, a single filter is coupled to two, three, or more data centers.

Figure 9:
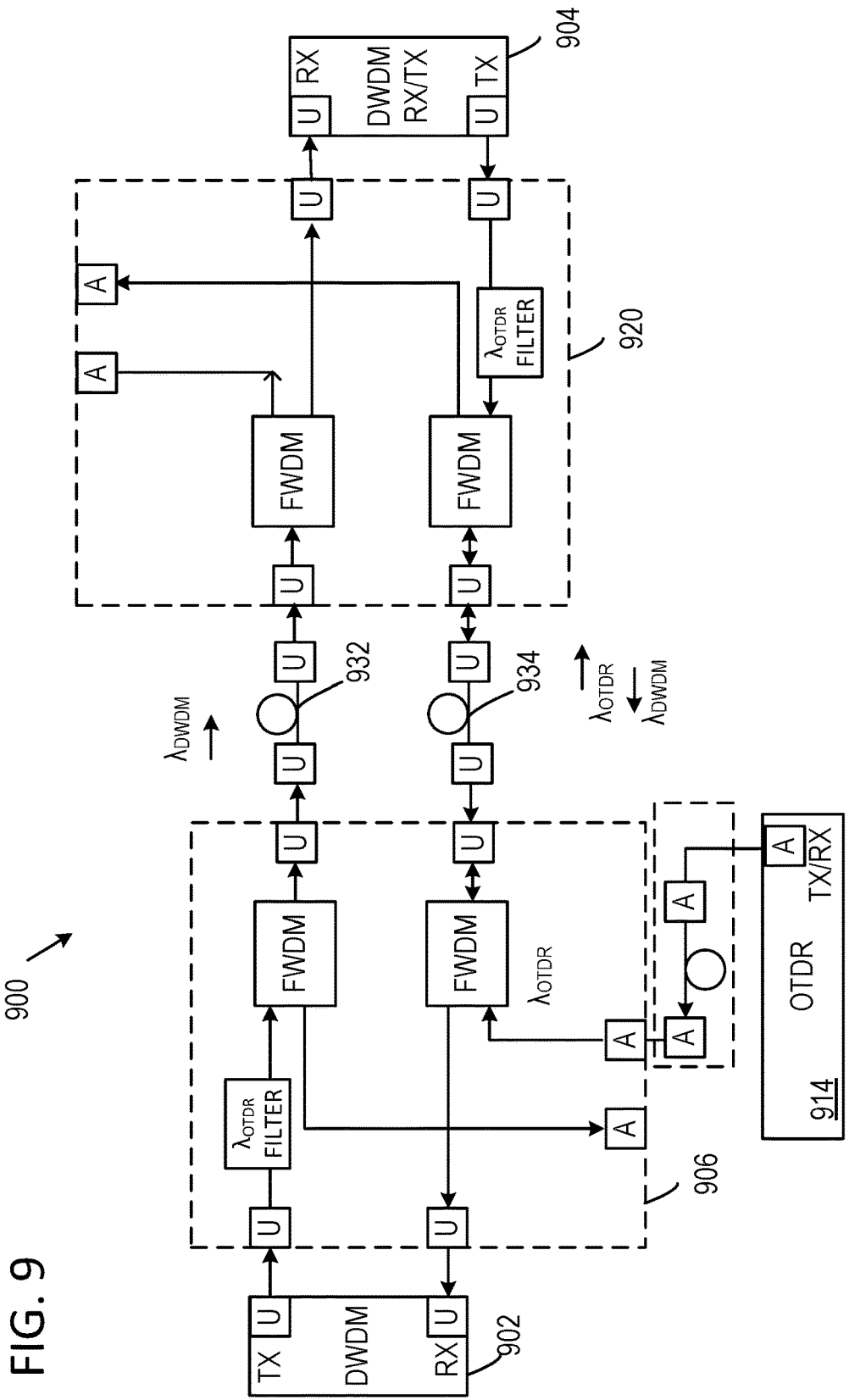
FIG. 9 illustrates a single OTDR, unidirectional monitoring system.

FIG. 9 is an example communication system 900 in which transceivers 902, 904 are coupled to respective filters 906, 920 and link fibers 932, 934. As shown, a single OTDR 914 couples OTDR pulses to the link fiber 934, while the link fiber 932 is not coupled to an OTDR at all. Such an arrangement can be referred to as a single OTDR, unidirectional monitoring system.

Figure 10:
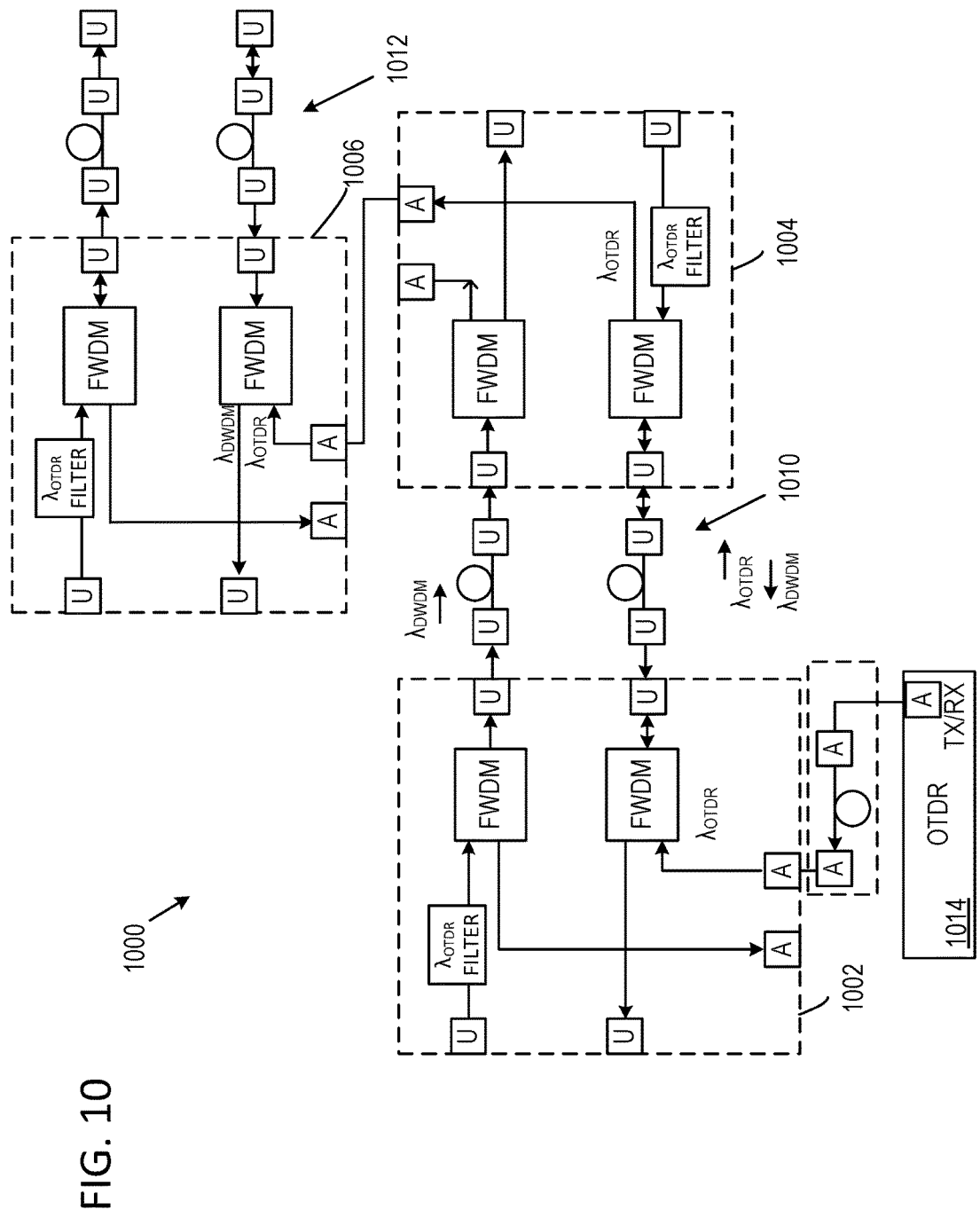
FIG. 10 illustrates a single OTDR, unidirectional, cascaded monitoring system.

FIG. 10 illustrates a representative single OTDR, unidirectional, cascaded monitoring system 1000. An OTDR 1014 is coupled to a first filter 1002 that is in turn coupled to a second filter 1004 via link fibers 1010. The second filter 1004 is coupled to a third filter 1006 that is coupled to link fibers 1012. As shown, an OTDR pulse is delivered so as to counter-propagate with communication signals in the filters 1002, 1004, 1006; in the filters 1002, 1004 the communication signal is a receiver-side signal and in the filter 1004, the communication signal is a transmitter-side signal. Only one of the link fibers is coupled for OTDR testing, but in other examples, both are.

Figure 11:
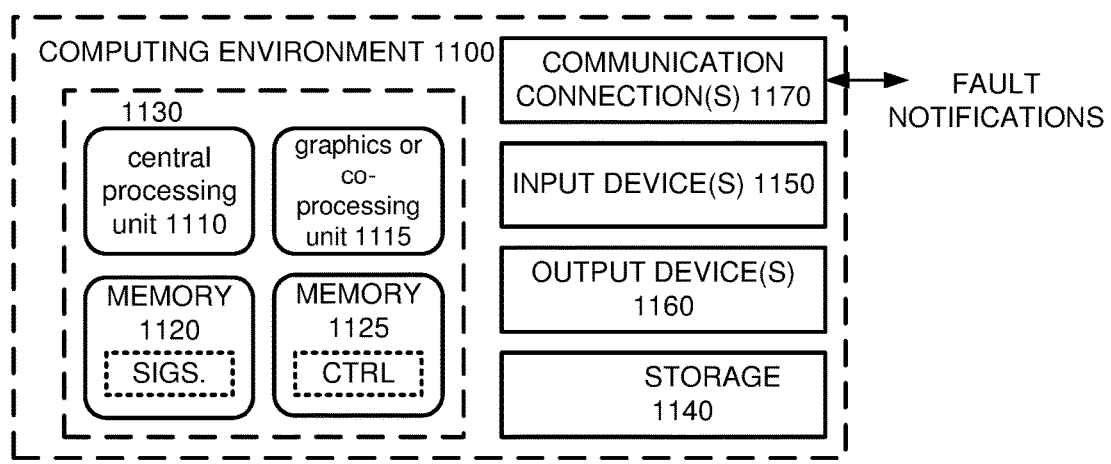
FIG. 11 depicts a generalized example of a suitable computing environment in which the described innovations may be implemented.

With reference to FIG. 1100, a computing environment 1100 for network monitoring and management includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1080 implementing one or more innovations described herein, in the form of computer-executable instructions suitable for execution by the processing unit(s). For example, control procedures, signature comparisons, signatures, and fault thresholds can be stored.

A computing system may have additional features. For example, the computing environment 1100 includes storage 1140, one or more input devices 1150, one or more output devices 1160, and one or more communication connections 1170. An interconnection mechanism (not shown) such as a bus, controller, or network interconnects the components of the computing environment 1100. Typically, operating system software (not shown) provides an operating environment for other software executing in the computing environment 1100, and coordinates activities of the components of the computing environment 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing environment 1100. The storage 1140 stores instructions for the software 1080 implementing one or more innovations described herein.

The input device(s) 1150 may be a touch input device such as a keyboard, mouse, pen, or trackball, a voice input device, a scanning device, or another device that provides input to the computing environment 1100. The output device(s) 1160 may be a display, printer, speaker, CD-writer, or another device that provides output from the computing environment 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Figure 12:
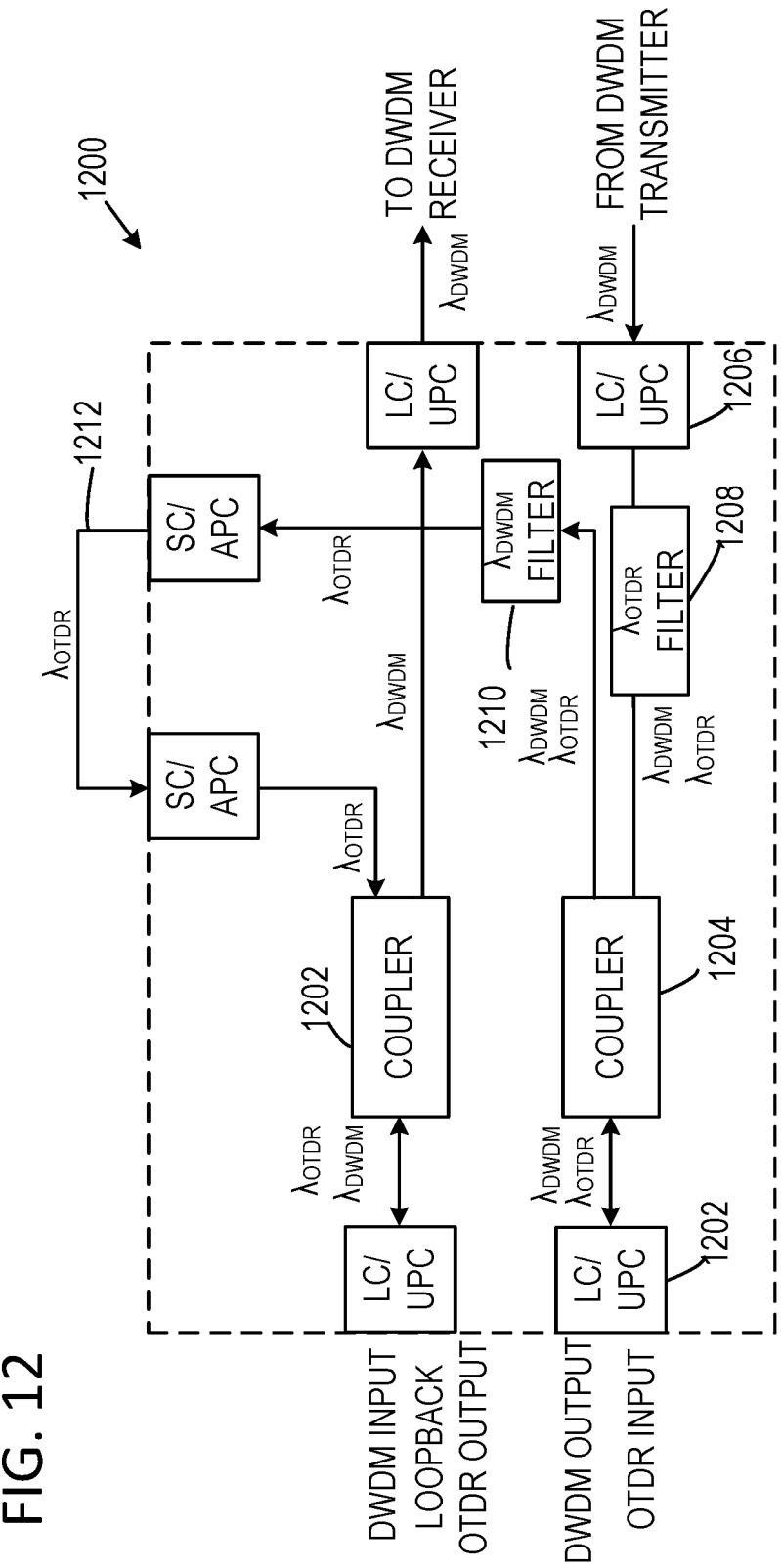
FIG. 12 illustrates a fiber coupler assembly that provides OTDR loopback and uses fiber couplers instead of FWDMs.

FIG. 12 illustrates an alternative coupling assembly 1200 that includes fiber couplers 1202, 1204 and not FWDMs. Couplers generally increase total loss, and need not be wavelength sensitive. Dual input couplers for single mode fibers (such as the couplers 1202, 1204) generally have four ports, but only three are shown for clarity. Because the coupler 1204 is not wavelength sensitive, significant portions of OTDR signals can be directed toward a connector 1206, and an OTDR filter 1208 can be situated to block or attenuate at OTDR wavelengths. In addition, a DWDM filter 1210 is situated to block or attenuate communication signals directed to a loopback fiber 1212. The coupling assembly can be used in single direction or bidirectional measurements, or loopback measurements.

In the above examples, fiber components such as FWDMs and couplers are used to combine and direct OTDR and communication signals. In other examples, prisms, mirrors, gratings, thin film coatings, holographic elements, or other optical components can be used to route communication and OTDR signals. In addition, planar waveguide components such as waveguides and components defined on or in silicon or other materials can be used.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples and should not be taken as limiting the scope of the disclosure. We therefore claim all that comes within the scope of the appended.

What is claimed is:
1. An optical communication system, comprising:
a first link fiber and a second link fiber;
a local optical transceiver and a remote optical transceiver that include respective optical transmitters that transmit wavelength multiplexed optical signals and respective optical receivers coupled to receive wavelength multiplexed optical signals;
a local monitor filter coupled to the local optical transceiver, the first link fiber, and the second link fiber, the first local monitor filter including a first local fiber wavelength division multiplexer (FWDM) and a second local FWDM coupled to the receiver and the transmitter, respectively, of the local optical transceiver, the first local FWDM coupled to direct a received communication signal in a communication wavelength range from the first link fiber to the receiver of the local optical transceiver, and the second local FWDM coupled to direct a transmitted communication signal in the communication wavelength range from the transmitter of the local optical transceiver to the second link fiber, the local monitor filter including a reflective optical filter that is transmissive in the communication wavelength range and reflective in a monitor wavelength range and situated between the second local FWDM and the transmitter of the local transceiver;
a remote monitor filter coupled to the remote optical transceiver and the first link fiber and the second link fiber, the remote monitor filter including a first remote fiber wavelength division multiplexer (FWDM) and a second remote FWDM coupled to the receiver and the transmitter, respectively, of the remote optical transceiver, the first remote FWDM coupled to direct a received communication signal in a communication wavelength range from the second link fiber to the receiver of the remote transceiver and the second remote FWDM coupled to direct a transmitted communication signal in the communication wavelength range from the transmitter of the remote transceiver to the first link fiber, the remote monitor filter including a reflective optical filter that is transmissive in the communication wavelength range and reflective in a monitor wavelength range and situated between the second remote FWDM and the transmitter of the remote transceiver;
an optical time domain reflector (OTDR) directly coupled to the first FWDM so as to couple an OTDR signal to the first link fiber through the first FWDM periodically during receipt of the communication signal from the first link fiber by the receiver of the local optical transceiver; and
a network controller in communication with the OTDR, the network controller including a processor and a memory storing fiber network signatures and GPS coordinates for a plurality of fiber network locations, wherein the network controller is configured to:
communicate a notification of a fiber network fault based on a comparison of a stored fiber network signature and an acquired fiber network signature from the OTDR;

retrieve and communicate GPS coordinates for a stored fiber network location that is closest to the fiber network fault on both sides of the fiber network fault; and classify the fiber network fault as an internal fault or an external fault based on the GPS coordinates.

2. An apparatus, comprising:

a first optical transceiver that includes a first optical receiver and a first optical transmitter;

a monitor filter that includes a first fiber wavelength division multiplexer (FWDM) having first, second, and third fiber ports, wherein the first fiber port is optically coupled to the third fiber port in a communication wavelength range, and the second fiber port and the third fiber port are optically coupled in in a monitoring beam wavelength range;

a first optical fiber connection optically coupled to the third fiber port of the FWDM so as to direct a received optical communication signal to the first optical receiver, wherein the first optical receiver is optically coupled to first fiber port of the FWDM;

a second optical fiber connection optically coupled to the first optical transmitter; and an optical time domain reflector (OTDR) directly coupled to the second fiber port of the first FWDM so as to couple an OTDR signal to the first optical fiber connection through the first fiber wavelength division multiplexer; and a network controller in communication with the OTDR, the network controller including a processor and a memory storing fiber network signatures and GPS coordinates for a plurality of fiber network locations, wherein the network controller is configured to communicate a notification of a fiber network fault based on the comparison of a stored fiber network signature and an acquired fiber network signature from the OTDR and to retrieve GPS coordinates for at least one stored fiber network location that is closest to the fiber network fault on either side of the fiber network fault and classify the fiber network fault as an internal fault or an external fault.

3. The apparatus of claim 2, wherein the monitor filter further comprises:

a reflective monitoring signal filter situated between the second optical fiber connection and the first optical transmitter.

4. The apparatus of claim 3, wherein the monitor filter further comprises:

a second fiber wavelength division multiplexer (FWDM) having first, second, and third fiber ports, wherein the first fiber port is optically coupled to the third fiber port in a communication wavelength range, and the second fiber port and the third fiber port are optically coupled in a monitoring beam wavelength range, wherein the reflective monitoring signal filter is coupled to the third fiber port of the second FWDM and to the second fiber connection and the first optical transmitter is coupled to the first fiber port of the second FWDM so as to be optically coupled to the second fiber connection in the communication wavelength range.

5. The apparatus of claim 2, wherein the monitor filter further comprises:

a second fiber wavelength division multiplexer (FWDM) having first, second, and third fiber ports, wherein the first fiber port is optically coupled to the third fiber port in a communication wavelength range, and the second fiber port and the third fiber port are optically coupled in a monitoring beam wavelength range, and further wherein the third fiber port of the second FWDM is optically coupled to the second fiber connection and the first optical transmitter is coupled to the first fiber port of the second FWDM so that that the first optical transmitter and the second fiber connection are optically coupled in the communication wavelength range.

6. The apparatus of claim 2, wherein the OTDR is coupled to the second fiber port of the first FWDM with at least one angled physical contact connector.

7. The apparatus of claim 2, wherein each of the first optical receiver and the first optical transmitter are coupled to the monitor filter with at least one physical contact connector.

8. The apparatus of claim 2, further comprising a first link fiber coupled to the first fiber connection and a second link fiber coupled to the second fiber connection.

9. The apparatus of claim 8, wherein the first fiber connection and the second fiber connection are optical fiber connectors or fusion splices.

10. The apparatus of claim 2, wherein the network controller is configured to retrieve and communicate GPS coordinates for stored fiber network locations that are closest to the fiber network fault on both sides of the fiber network fault.

11. The apparatus of claim 10 further comprising a fiber coupled to the OTDR and the second fiber port of the first FWDM so as to displace an OTDR dead zone.

12. The apparatus of claim 2, further comprising a fiber situated to couple the third fiber port of the first FWDM to the first fiber port of the second FWDM.

13. The apparatus of claim 2, wherein the network controller is configured to retrieve and communicate GPS coordinates for one stored fiber network locations that are closest to the fiber network fault on both sides of the fiber network fault.

14. A method, comprising:

storing, in a computer-readable memory, GPS coordinates associated with a plurality of link optical fiber locations;

at an optical transceiver, coupling an optical time domain reflectometer (OTDR) through a fiber wavelength division multiplexer (FWDM) to counter-propagate an OTDR signal with a communication signal directed to the optical transceiver from the link optical fiber;

acquiring a link fiber signature based on portions of the OTDR signal returned from the link fiber;

comparing the acquired link fiber signature with a stored link fiber signature to locate a link fiber fault;

retrieving, from the computer-readable memory, GPS coordinates for a link fiber location closest to the link fiber fault on either side of the link fiber fault; and classifying the fiber network fault as an internal fault or an external fault based on the GPS coordinates.

15. The method of claim 14, further comprising coupling the OTDR signal to counter-propagate the OTDR signal simultaneously with the communication signal in the first link optical fiber.

* * * * *